(12) United States Patent
Xu et al.

(10) Patent No.: US 8,996,896 B2
(45) Date of Patent: Mar. 31, 2015

(54) HYBRID OPTIMIZED PERSONAL COMPUTER

(75) Inventors: Shuang Xu, Shenzhen (CN); Sien Chen, Shenzhen (CN); Dongbo Hao, Shenzhen (CN); Jun Hua, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 572 days.

(21) Appl. No.: 12/819,150

(22) Filed: Jun. 18, 2010

(65) Prior Publication Data

US 2010/0325460 A1   Dec. 23, 2010

(30) Foreign Application Priority Data

Jun. 18, 2009   (CN) .......................... 2009 1 0147729

(51) Int. Cl.
*G06F 1/32*   (2006.01)
*G06F 15/78*   (2006.01)

(52) U.S. Cl.
CPC .......... *G06F 15/7842* (2013.01); *G06F 1/3203* (2013.01); *G06F 1/3243* (2013.01); *Y02B 60/1239* (2013.01)
USPC ......................................... 713/320; 713/300

(58) Field of Classification Search
USPC .................................. 713/300, 320, 323, 324
See application file for complete search history.

(56) References Cited

U.S. PATENT DOCUMENTS

| | | | |
|---|---|---|---|
| 6,085,330 A * | 7/2000 | Hewitt et al. .................. 713/322 |
| 6,289,464 B1 * | 9/2001 | Wecker et al. ................. 713/300 |
| 2003/0014677 A1 * | 1/2003 | Howard et al. ................. 713/323 |
| 2004/0006690 A1 * | 1/2004 | Du et al. ............................ 713/2 |
| 2004/0162922 A1 * | 8/2004 | Kardach et al. ................... 710/15 |
| 2008/0235527 A1 * | 9/2008 | Heller et al. ................... 713/320 |
| 2009/0193243 A1 * | 7/2009 | Ely .................................... 713/2 |

* cited by examiner

*Primary Examiner* — Paul Yanchus, III
(74) *Attorney, Agent, or Firm* — Zilka-Kotab, PC

(57) ABSTRACT

An Optimized Personal Computer (OPC) system may be a multi-functional processing unit with ultra-low power consumption and may consist of a single chip having a plurality of processors thereon. Each processor may be specialized for tasks including computing, graphic processing and audio processing. The OPC may be connected to a mother board, a memory unit and an I/O interface. The OPC may be connected to a primary PC (either in an expansion slot or in a drive bay) via a USB connection, for example, and be configured to run continuously and take over certain tasks from the primary PC as needed while the primary PC hibernates. The OPC may also be embedded in a monitor or other peripheral devices.

22 Claims, 2 Drawing Sheets

HYBRID OPTIMIZED PERSONAL COMPUTER

CLAIM OF PRIORITY

The present application claims the priority of Chinese Patent Application filed Jun. 18, 2009 under application number 200910147729.0, which is incorporated herein by reference.

FIELD OF INVENTION

The present invention relates to a Hybrid Optimized Personal Computer (HOPC) system, and more particularly to a HOPC having a traditional personal computer (PC) connected to an optimized PC with multiple functions and ultra-low power consumption.

BACKGROUND

With the increasing integration degree of integrated circuits (ICs), more and more functions can be combined on a single chip. Currently, there is a chip available referred to as a "Computer-On-a-Chip" ("CoC") or "System-On-a-Chip" ("SoC"), such as the Tegra™ processor from NVIDIA Corporation. The CoC or SoC is a heterogeneous processor architecture with multiple processors, each designed for a specific class of tasks including, but not limited to, a central processing unit (CPU), a video processor, an image processor, an audio processor and a memory. These processors are used together or independently to perform what can be implemented in a traditional PC, but integrated onto a single chip. Besides the variety of functions, this CoC or SoC has another advantage in that it usually has ultra-low power consumption of several watts, for example, when working on a full load.

Compared to the ultra-low power consumption and multiple functions of the above highly integrated SoC or CoC, the traditional CPU used in a traditional PC has only a single function of computing and usually has a higher power consumption of more than 100 watts when working on a full load. This high power consumption is unacceptable if the PC is working for 24 hours, 7 days-a-week and the PC may have an unstable working performance due this continuous high power consumption.

As an increasing variety of services provided via the Internet are continuing to be available, there is a trend towards people being on-line continuously 24 hours each day using their computer in order to play online games, download music and movies, and make remote accesses, etc. It is problematic for traditional PCs to be continuously running for 24 hours, 7 days-a-week, for the reasons stated as above. Therefore, there is a need for an improved and optimized PC that can run stably for 24 hours, 7 days-a-week, without consuming a large amount of power.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified need an Optimized Personal Computer (OPC) system is provided. The OPC system may be a multi-functional processing unit with ultra-low power consumption and may consist of a single chip having a plurality of processors thereon. Each processor may be specialized for tasks including computing, graphic processing and audio processing. The OPC may be connected to a mother board, a memory unit and an I/O interface.

The OPC may be connected to a primary PC (either in an expansion slot or in a drive bay) via a USB connection, for example, and be configured to take over certain tasks from the primary PC as needed while the primary PC hibernates. The OPC may also be embedded in a monitor or other peripheral devices.

Other features and embodiments are described below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Described below is an optimized PC system that works as a slave system to a traditional PC (referred to as a primary PC herein). Using the SoC or CoC chip as a CPU, the optimized PC system can perform a variety of functions with ultra-low power consumption traditionally performed on a primary PC which may include, but are not limited to, computing, displaying images, playing videos and running a variety of applications. Therefore, the optimized PC can work as a secondary system running for 24 hours, 7 days-a-week independently, together with the primary PC, or when the primary PC is shut down or hibernating. It is advantageous to provide such a secondary OPC system for the primary PC that the primary PC can assign some continuously running tasks to the OPC system in order to achieve an optimal utilization of resources. Examples of such assigned tasks may include, but are not limited to, downloading music and movies and playing online games. Theses tasks can be performed stably on the OPC 24 hours, 7 days-a-week, due to the ultra-low power consumption of the OPC.

Figure 1:
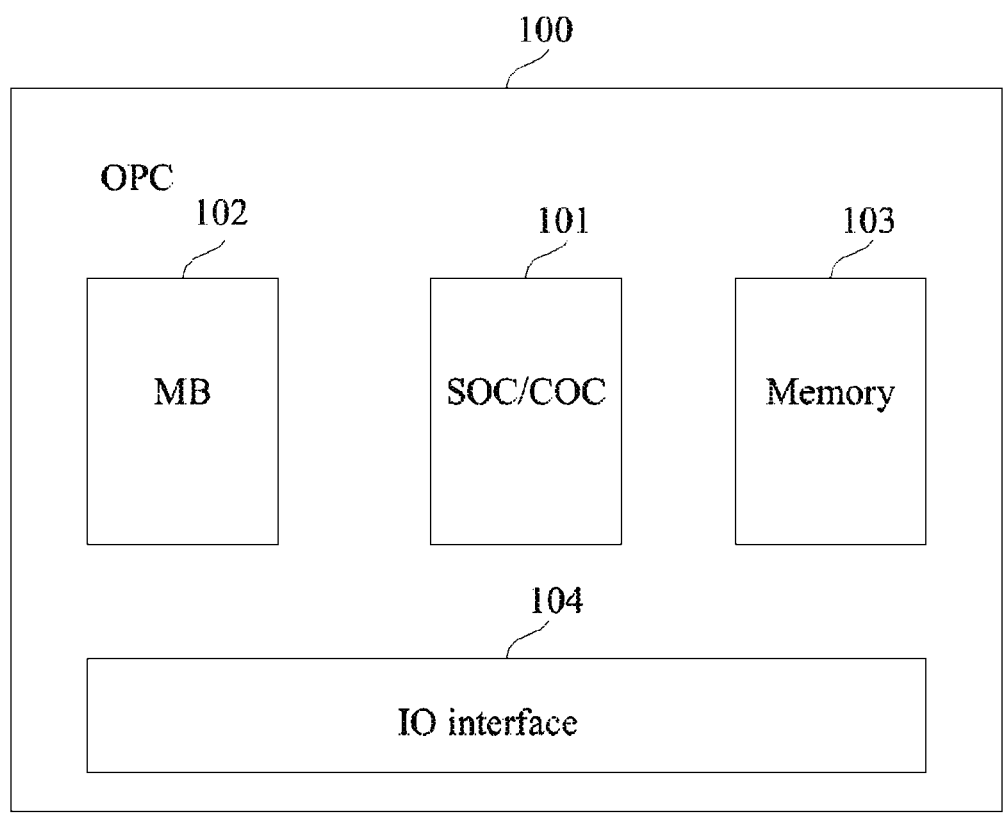
FIG. 1 shows the architecture of an exemplary optimized PC according to the present invention.

Referring to FIG. 1, shown is an exemplary architecture of an OPC system 100 according to an embodiment of the present invention. An OPC system 100, for example, may comprise a SoC/CoC 101, a mother board (MB) 102, a memory 103 and an I/O interface 104. The SoC/CoC 101 is a kind of multi-functional processing unit having multiple processors on a single chip, each processor designed for a specific class of tasks. The SoC/CoC 101 may comprise, but is not limited to, a CPU, a video processor, an image processor, and an audio processor. An example of such a commercially available SoC/CoC 101 is the Tegra™ processor from NVIDIA Corporation. The SoC/CoC 101 has a high degree of integration and thus a small size. It also usually has an ultra-low power consumption of less than 10 watts, for example, even when working on a full load. The mother board (MB) 102 may adopt forms and architectures commonly known and used in the art. Preferably, the MB 102 may also have a high degree of integration and a small size such that when the SoC/CoC 101 is affixed to the MB 102, it constitutes a small scale portable OPC system. The memory 103 may adopt forms and architectures commonly known and used in the art, such as random access memory (RAM), read only memory (ROM), hard disk drives, flash memory, and so on. However, in consideration of factors including stability of operation, high storage capacity, and requirements for operating silently for 24 hours, 7 days-a-week, flash memory is preferable for the memory 103. Although a separate memory 103 is shown in FIG. 1, the memory 103 may alternatively be integrated with or embedded in the SoC/CoC 101.

As a system that may work together with or independent of a primary PC, the OPC system 100 has an I/O interface 104 operable for accepting different types of peripherals. The I/O interface 104 may be configured to have a variety of interfaces commonly known and used in the art including, but not limited to, a data transfer port such as Universal Serial Bus (USB) port, a parallel port, a serial port, IEEE 1394 port, video and audio ports such as Video Graphics Array (VGA), High-Definition Multimedia Interface (HDMI), Super Video (S-Video), audiovisual (AV) and Digital Visual Interface (DVI) ports, and cable and wireless communication ports such as local area network (LAN) and wireless fidelity (Wi-Fi) ports. Using the I/O interface 104, the OPC system 100 may be connected to a plurality of peripherals such as a monitor, mouse, keyboard, printer, microphone, speaker, camera and router, etc. All of the interfaces may be integrated onto the MB 102. Therefore, the OPC system 100 may work as a mini computer that may perform what is traditionally implemented on a traditional PC. Preferably, the OPC system 100 is connected to the primary PC via USB port. The advantage of using a USB port as a connection is in that the OPC system 100 can be power-supplied directly with the 5VSB of the primary PC from the primary PC's USB connector. The 5VSB (5 volt stand-by) is a 5 volt rail that's always on even when the primary PC is turned off. In this way the OPC can receive the power via the USB port as a normal USB peripheral, without providing a separate power supply to the OPC system 100, which will further decrease the size of the OPC 100 and help to integrate the OPC 100 with other devices.

Figure 2:
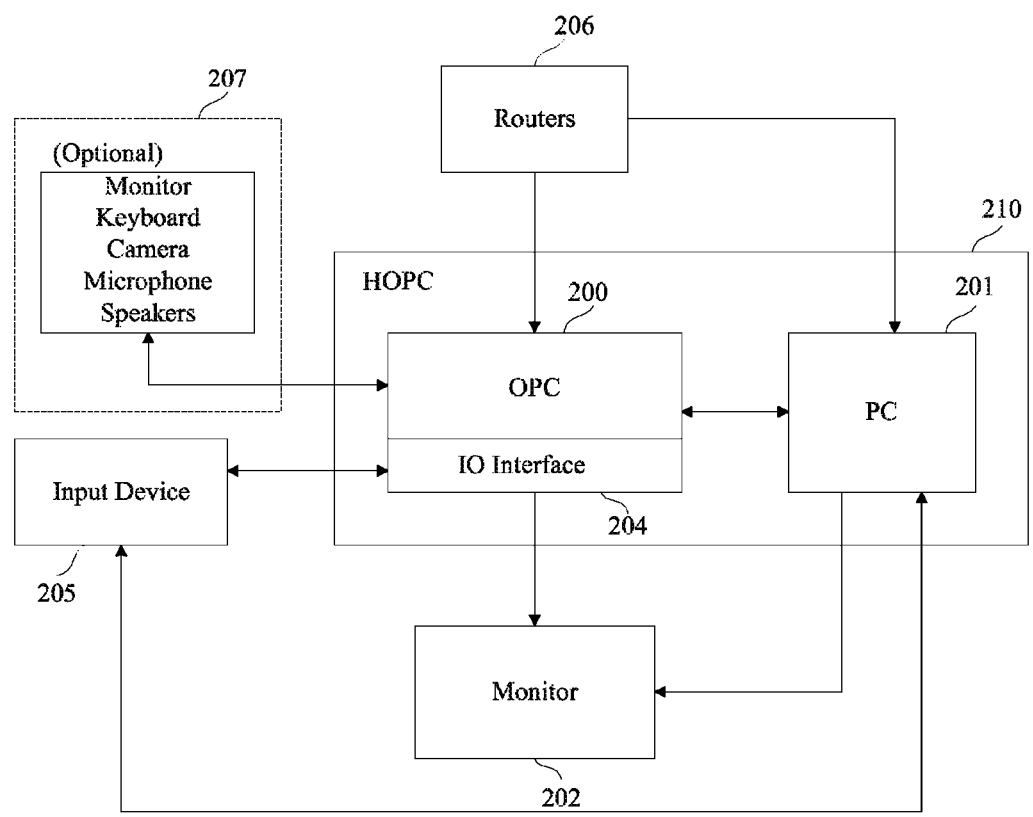
FIG. 2 shows the optimized PC according to the present invention connected to a traditional PC and a variety of peripherals.

Referring next to FIG. 2, shown is an exemplary OPC system according to an embodiment of the present invention connected to a primary PC and a variety of peripherals. The OPC system 200 together with the primary PC 201 comprises a Hybrid OPC (HOPC) 210. In the exemplary Hybrid OPC 210, the OPC system 200 is connected to a primary PC 201 via a USB port, and can transfer data and be power-supplied with the primary PC 201 concurrently. A monitor 202 originally connected to the primary PC 201 may be also connected to the OPC 200 via a VGA port in its I/O interface 204, and thus the monitor 202 can be shared by the primary PC 201 and OPC 200 together. Similarly, an input device 205, such as a mouse, keyboard, camera and pointing device, originally connected to the primary PC 201 may also be shared by the OPC 200 via a corresponding port in the OPCs I/O interface 204. The shared peripherals between the primary PC 201 and the OPC system 200 may also include a cable/wireless router 206 and audio devices such as speakers (not shown), etc.

Alternatively, the OPC system 200 may be not connected to and share the peripherals originally connected to the primary PC, but equipped with separate corresponding peripherals 207 instead. These separate peripherals 207 may include, but are not limited to, items such as a monitor in order to display the working status of the OPC system 200 in real time. The separate peripherals 207 are preferably designed to have a small size and lower power consumption in order to be integrated with the OPC system 200. It is advantageous to have separate peripherals such that the originally connected peripherals do not need to be activated so as to lower the power consumption of the HOPC to a minimal level.

The HOPC 210 may, for example, have two working modes. One mode is referred to herein as Normal Mode, and the other is referred to as Hybrid Mode. When the HOPC 210 is working in the Normal Mode, the primary PC 201 and the OPC system 200 operate concurrently, and the OPC system 200 performs some tasks assigned by the primary PC 201. In this mode, the HOPC 201 looks like a traditional PC and the OPC 200 works in the background and sometimes may be invisible to the users. When needed, the monitor 202 shared by the primary PC 201 and the OPC system 200 can be switched to display the working status of the OPC 200 and the primary PC 201 respectively. Other shared peripherals may also be switched to serve to the OPC 200 and/or the primary PC 201 as required.

When the HOPC 210 is working in the Hybrid Mode, the primary PC 201 is in a state of hibernation, and the OPC 200 takes the place of performing all the possible applications alone that would otherwise be performed on the primary PC. With the power supply from the primary PC 201 via the USB port, some applications such as downloading movies can be run 24 hours, 7 days-a-week, with ultra-low power consumption. In Hybrid Mode, the OPC 200 has an additional functionality capable of waking up the primary PC (i.e., removing it from hibernation) as needed. For example, when the OPC 200 is downloading movies from the Internet while primary PC 201 is in hibernation, and it is found that the memory in the OPC system becomes full and cannot store any new movies, the OPC 200 may then automatically send a wake-up signal to the primary PC. The wake-up signal will cause the primary PC 201 to boot up and be activated to use a memory storage device in the primary PC 201 in order to continue storing downloaded movies. The contents stored in the OPC 200 memory may also be transferred to the PC 201 and then emptied. When the downloading is finished or the memory in the OPC 200 has been emptied, the primary PC 201 may then automatically enter hibernation again and wait for the next wake-up signal. This wake-up process may be automatically performed by the primary PC 201 and OPC 200, which ensures stable and reliable continuous operation of the OPC 200 for 24 hours, 7 days-a-week.

The OPC 200 may be implemented as a separate terminal product for an end user, and may be connected or integrated with the primary PC in the following example forms so as to constitute a HOPC.

1. OPC Card

The OPC 200 may be implemented as a normal add-in card inserted into the slots provided on the mother board of the primary PC 20'1, in a similar manner as conventional audio cards, graphic cards and network cards. The OPC add-in card has an internal USB cable and interface that connects to the primary PC 201 to communicate with and get power supply from the primary PC 201. A variety of I/O interface ports of the OPC 200 such as LAN, DVI, VGA and USB, etc. may be arranged at the bracket of the OPC card for connecting to the peripherals.

2. OPC Box-type Device

The OPC 200 may also be implemented as a box-type device designed to fit, for example, in the 3.5 inch or 5.25 inch internal drive bay behind a front panel of the primary PC 201 in the same manner as a conventional CD-ROM device. The OPC box-type may also use an internal USB cable to connect to the primary PC to communicate with and get power supply from the primary PC. The OPC may be equipped with a daughter card to provide LAN, DVI, VGA and USB I/O interface ports, etc. at the bracket or these I/O ports could be arranged on the OPC box's front panel. The optional separate peripheral interfaces, such as interfaces for a separate camera, display, keyboard, microphone and speakers for the OPC, may also be provided on the OPC box's front panel.

Both of the above OPC card and OPC box-type devices may work and be compatible with current PC system and will not enlarge the size of current PC systems.

3. OPC Monitor

An OPC 200 may be embedded into a monitor and use an additional USB cable or share the existing USB cable of the monitor to connect to the primary PC in order to communicate with and get its power supply from the primary PC 201. The I/O interface ports, including LAN, DVI, VGA, USB ports and optional camera, display, keyboard, microphone and speaker ports of the OPC may, for example, be arranged on the back of the monitor or around the frame of the monitor.

4. OPC Notebook

When anOPC 200 is applied in a notebook, the OPC 200 may be implemented as an embedded internal module in a notebook, in a similar manner as an add-in card for a PC. A variety of the I/O interface ports of the OPC may be provided besides the original I/O ports of the notebook.

Some specific example applications for the HOPC according to the present invention are introduced below.

Exemplary Embodiment 1: Home Downloading Center

As the bandwidth of the Internet increases, the ability to download high volumes of data over the Internet is becoming increasingly important in web-based applications. Users are increasingly downloading High Definition (HD) movies online, playing games online in real-time, backing up their local data to online servers, downloading a variety of large software applications and updates, and downloading and uploading music and video content directly to and from websites or via point to point (P2P) and file sharing tools such as Bit Torrent. All this online activity results in large masses of data needed to be downloaded from and uploaded to the Internet on a daily basis.

A traditional PC usually has a power consumption of about 100 watts when running applications and programs that frequently download and upload data from and to the Internet. This is an unacceptably high power consumption if such programs are running for 24 hours, 7 days-a-week. With an HOPC 210 as described herein, only the OPC 200 portion of the HOPC needs to be activated in order to run these downloading-type applications while the primary PC maintains itself in a state of hibernation. In this way, the power consumption is only a few Watts, which is no more than 10% of the traditional PC power consumption running such applications. The OPC 200 will store the downloaded data on its memory (e.g., flash memory) which provides another advantage over the traditional PC in that that no noise will be produced when storing data. This advantage makes the HOPC 210 more suitable for working 24 hours, 7 days-a-week. For example, only when the flash memory of the OPC is full, will the OPC 200 boot up the primary PC 201 and upload the data onto the hard disk of the primary PC. This process can be done automatically when needed without any manual intervention.

Exemplary Embodiment 2: Home/Office Data Share Center for Remote Access

As the PC plays an increasingly important role in people's daily life, more people are having multiple PCs in their home, office and other locations. Therefore, there is a need to share and access the data stored on these different PCs at any given time. For example, a person at home may want to access the files stored in their office PC to complete their work, a person at a party may want to access his photos and videos recently taken during his vacation that are stored in his PC at home in order to show them to his friends, or a person on a business trip may want to access a PowerPoint slide show stored in his PC in the office in order to present the slide show to his client.

One way to address the above situations is to use the HOPC 210 described herein as a data sharing and call center that is available 24 hours, 7 days-a-week. Since the OPC can be active for 24 hours, 7 days-a-week due to its low power consumption and thus has continuous access to the Internet via a LAN or WiFi connection, the OPC can be accessed remotely from anywhere via the Internet, in order to access, use and download the data stored in the HOPC 210. When necessary, the OPC 200 can operate as a stand-alone remote terminal with its own storage since the OPC 200 can perform equivalent functions as a traditional PC. In this way, data stored on the OPC 200 can be remotely manipulated.

When a Wireless Home Entertainment plan is implemented, that is, when a variety of home appliances are networked to share data with each other via cable/wireless access, downloaded HD movies and other content stored in the HOPC 210 may be shared with the TV set and played on the latter directly via the Internet/intranet.

Exemplary Embodiment 3: 7×24 hours Online Visual-IP-Phone

With the increasing network bandwidth, use of Internet Protocol (IP) phone technology is becoming increasingly popular. A variety of software applications have appeared to allow users to make voice telephone calls over the Internet, instant messaging, file transfer and video conferencing etc., (e.g., Skype™). Not only may a user receive calls from other users via their computers, which is currently free-of-charge, but also call regular phones and mobile phones worldwide at much less cost than using traditional telephones.

With the capability of being online 24 hours, 7 days-a-week due to the low power consumption, OPC 200 may be used as an online Internet phone on continuous standby. This may be a complete replacement of the traditional telephone. This application may be implemented by running IP phone software on the OPC 200 and providing a separate microphone, speaker and keyboard arranged on the OPC 200 or shared with the primary PC.

When equipped with a camera and display, the OPC also serves as a video phone. The cost of an IP phone provided via the OPC 200 will be much lower than that of the regular phone due to the telecommunications being over the Internet, while keeping the quality nearly the same. With the online IP phone provided via the OPC, the regular telephone may soon become obsolete.

Exemplary Embodiment 4: Net Notebook and Net PC

Since the OPC 200 can process a variety of tasks, including, but not limited to, computing, video processing, image processing, audio processing and storage, the OPC 200 itself may work as a mini computer after being equipped with peripherals such as a keyboard, mouse, speaker and display. When running applications involving highly complex computation is not required, the OPC 200 could provide almost all of the basic applications like Internet browsing, downloading and playing music and video, and displaying images with an Operating System (OS) configured specifically for such operations. Also, due to its ultra low power consumption, the OPC 200 is particularly suitable for a notebook computer specialized as described above since it provides much longer working time with less drain on the notebook battery.

Exemplary Embodiment 5: WiFi Access Point

Since the OPC 200 itself has the function of accessing to the Internet/Intranet via cable and/or WiFi, it may be used as a cable/WiFi access point and could provide Internet service to the primary PC 201, notebooks and cell phones to which it connects.

Exemplary Embodiment 6: High Performance Graphics Card

An OPC 200 may be equipped with a SoC/CoC 101 that has a 3D-engine and excellent image/video processing capabilities, for example, the Tegra™ processor from NVIDIA Corporation. Therefore, such OPCs can provide brilliant 3D User Interface (UI) graphics. In some cases, where the primary PC is not installed with a specific graphics card and only has basic and simple image/video processing capabilities, the OPC 200 may function as a separate high performance graphics card, which makes it possible for the primary PC 201 to process complex video such as those involved in 3D gaming and HD video display.

The OPC 200 described herein may cover a variety of application requirements from those of an entry-level user to a high-end user. Many current applications can be transferred from the primary PC 201 to the OPC 200. Thus, users may have a device (i.e., the OPC 200) attached or integrated to their traditional computers that is capable of being online for 24 hours, 7 days-a-week having ultra low power consumption and high stability. With this unique feature, a plurality of applications requiring a continuous operation, such as those for downloading movies and providing IP phone service, can be successfully run. The OPC 200 may also function as a data center which is accessible for online for remote access 24 hours, 7 days-a-week.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application to thereby enable others skilled in the art to best utilize the invention and various embodiments with various modifications as are suited to the particular use are contemplated. The scope of the invention is to be defined by the claims appended hereto and their equivalents.

What is claimed is:

1. A system, comprising:
   a multi-functional processing unit comprising an integrated circuit having a plurality of processors thereon;
   a motherboard to which the multi-functional processing unit is connected;
   a memory unit connected to the motherboard and in communication with the multi-functional processing unit; and
   an I/O interface connected to the motherboard and in communication with the multi-functional processing unit, the I/O interface including a (Universal Serial Bus) USB interface,
   wherein the multi-functional processing unit is configured to transmit a wake-up signal to a primary personal computer (PC) when the memory unit is substantially full and continue to download data to a memory storage device of the primary PC instead of the memory unit,
   wherein the primary PC is configured to enter a hibernation state after the data has been downloaded to the memory storage device, and
   wherein the system is connected to the primary PC via the USB interface for data communication and power supply, and wherein the system receives power from a USB connector of the primary PC.

2. The system of claim 1 wherein said system is arranged on an add-in card configured for insertion into an expansion slot of the primary PC, said add-in card having the USB interface capable of connection to the USB connector of the primary PC in order to receive said power and communicate with the primary PC.

3. The system of claim 1 wherein said system is arranged within a monitor, said system for receiving said power and communicating with the primary PC via a port of the monitor.

4. The system of claim 1 wherein said system is arranged within a box housing configured to fit in an internal drive bay of the primary PC and has a USB cable, said USB cable for connecting to the primary PC to communicate with and receive said power via the USB connector of the primary PC.

5. The system of claim 1 wherein the primary PC is a notebook computer, and wherein said system is embedded within and connected to the notebook computer.

6. The system of claim 1, wherein said memory unit is at least one of RAM, ROM, hard disk drive, and flash memory.

7. The system of claim 1, wherein said I/O interface further includes at least one of a parallel port, serial port, IEEE 1394, VGA, HDMI, S-Video, AV, DVI, LAN and WiFi.

8. The system of claim 1, wherein said multi-functional processing unit comprises a central processing unit, a graphics processing unit, and an audio processing unit.

9. The system of claim 1, wherein said system receives said power from a 5 volt stand-by of said USB connector of the primary PC.

10. The system of claim 1, wherein said system is configured to automatically wake up the primary PC from hibernation when it is automatically determined by the multi-functional processing unit that further processing capabilities of the primary PC are needed.

11. The system of claim 9, wherein said system has one or more of the following functionalities: a functionality to share peripheral devices with the primary PC, a functionality to run peripheral devices separately from the primary PC.

12. The system of claim 11, wherein said peripheral devices is at least one of a keyboard, a mouse, a display, a monitor, a microphone, a speaker, a camera and a router.

13. A system comprising:
   a primary personal computer (PC); and
   a secondary PC connected to the primary PC via a USB interface for data communication between the secondary PC and the primary PC and for providing power supply to said secondary PC, said secondary PC comprising a multi-functional processing unit comprising an integrated circuit having a plurality of processors thereon and a memory unit in communication with the multi-functional processing unit,
   wherein the multi-functional processing unit is configured to transmit a wake-up signal to the primary PC when the memory unit is substantially full and continue to download data to a memory storage device of the primary PC instead of to the memory unit,
   wherein the primary PC is configured to enter a hibernation state after the data has been downloaded to the memory storage device, and
   wherein the secondary PC receives power from a USB connector of the primary PC.

14. The system of claim 13 wherein the secondary PC is configured to be continuously running while the primary PC is in the hibernation state.

15. The system of claim 13 wherein the secondary PC is automatically assigned by the primary PC to perform specified computing tasks instead of the primary PC.

16. The system of claim 15 wherein the specified computing tasks include at least one of downloading of data from a network, uploading of data to a network, graphics processing, Internet Protocol (IP) telephone services, backing up data.

17. A method comprising:
automatically assigning computing tasks of a primary computing system to a slave computing system connected to the primary computing system using a USB interface, wherein said slave computing system comprises a multi-functional processing unit comprising an integrated circuit having a plurality of processors thereon and a memory unit in communication with the multi-functional processing unit; and
automatically transferring performance of the computing tasks back to the primary computing system by transmitting a wake-up signal to the primary computing system when the memory unit is substantially full;
downloading data from a network to a memory storage device of the primary computing system instead of to the memory unit; and
automatically assigning the computing tasks of the primary computing system to the slave computing system such that the primary computing system may enter a hibernation state after the data has been downloaded to the memory storage device,
wherein the slave computing system is connected to the primary computing system via the USB interface for data communication and power supply, and wherein the slave computing system receives power from a USB connector of the primary PC.

18. The method of claim 17 wherein the assigning of the computing tasks occurs when the primary computing system is in the hibernation state.

19. The method of claim 17 wherein power consumption of the slave computing system is lower than that of the primary computing system.

20. The method of claim 17 wherein power consumption of the slave computing system is no more than approximately 10 watts.

21. The system of claim 1 wherein the multi-functional processing unit is tasked with downloading movies from a network to the memory unit while the primary PC is in the hibernation state, and the multi-functional processing unit sends the wake-up signal to the primary PC in response to a determination that a next movie to be downloaded from the network cannot be stored in the memory unit being utilized by the multi-functional processing unit.

22. The system of claim 3 wherein the monitor that includes the system is connected to the primary PC, such that the monitor is shared by both the primary PC and the system.

* * * * *